United States Patent [19]
Hult

[11] Patent Number: 5,201,352
[45] Date of Patent: Apr. 13, 1993

[54] ROTATABLE BLADE FOR CLEARING UNITS

[75] Inventor: Bror E. G. Hult, Filipstad, Sweden

[73] Assignee: FMG Timberjack AB, Filipstad, Sweden

[21] Appl. No.: 828,925
[22] PCT Filed: May 28, 1990
[86] PCT No.: PCT/SE90/00354
    § 371 Date: Jan. 30, 1992
    § 102(e) Date: Jan. 30, 1992
[87] PCT Pub. No.: WO90/14934
    PCT Pub. Date: Dec. 13, 1990

[30] Foreign Application Priority Data
May 30, 1989 [SE] Sweden .............. 8901941-8

[51] Int. Cl.⁵ .................. B27G 13/08; B26D 1/00
[52] U.S. Cl. .................. 144/218; 144/230; 144/231; 144/241; 407/35; 407/113
[58] Field of Search .......... 407/32, 33, 34, 35, 407/43, 113; 144/218, 230, 231, 241

[56] References Cited

U.S. PATENT DOCUMENTS

| | | | |
|---|---|---|---|
| 1,946,069 | 2/1934 | Miller | 407/33 |
| 3,017,912 | 1/1962 | Sybertz et al. | 407/35 |
| 4,169,690 | 10/1979 | Kendra | 407/113 |
| 4,271,882 | 6/1981 | Valo | 407/113 |
| 4,462,725 | 7/1984 | Satran et al. | 407/113 |
| 4,932,813 | 6/1990 | Qvart | 407/49 |

FOREIGN PATENT DOCUMENTS

| | | |
|---|---|---|
| 149682 B | 9/1981 | Denmark . |
| 2031558 | 2/1971 | Fed. Rep. of Germany . |
| 2315044 | 10/1974 | Fed. Rep. of Germany . |
| 2459807 | 6/1976 | Fed. Rep. of Germany . |
| 7416304-9 | 1/1978 | Sweden . |
| 637060 | 7/1983 | Switzerland . |

Primary Examiner—W. Donald Bray
Attorney, Agent, or Firm—Nixon & Vanderhye

[57] ABSTRACT

The invention relates to a rotatable blade (11) for clearing units having a plurality of teeth (1) spaced around the periphery of the blade. The teeth (1) are dismountable and/or replaceable and symmetrically shaped with several cutting edges (3), each tooth fitting into a locking recess (10) in the blade (11) with a shape corresponding to the shape of the tooth such that only one of the cutting edges (3) of the tooth projects from the blade, the remaining cutting edges (3) being located in the recess (10). The tooth (3) can be removed from the recess (10), rotated and replaced in the recess (10) such that a new cutting edge (3) projects from the blade.

6 Claims, 2 Drawing Sheets

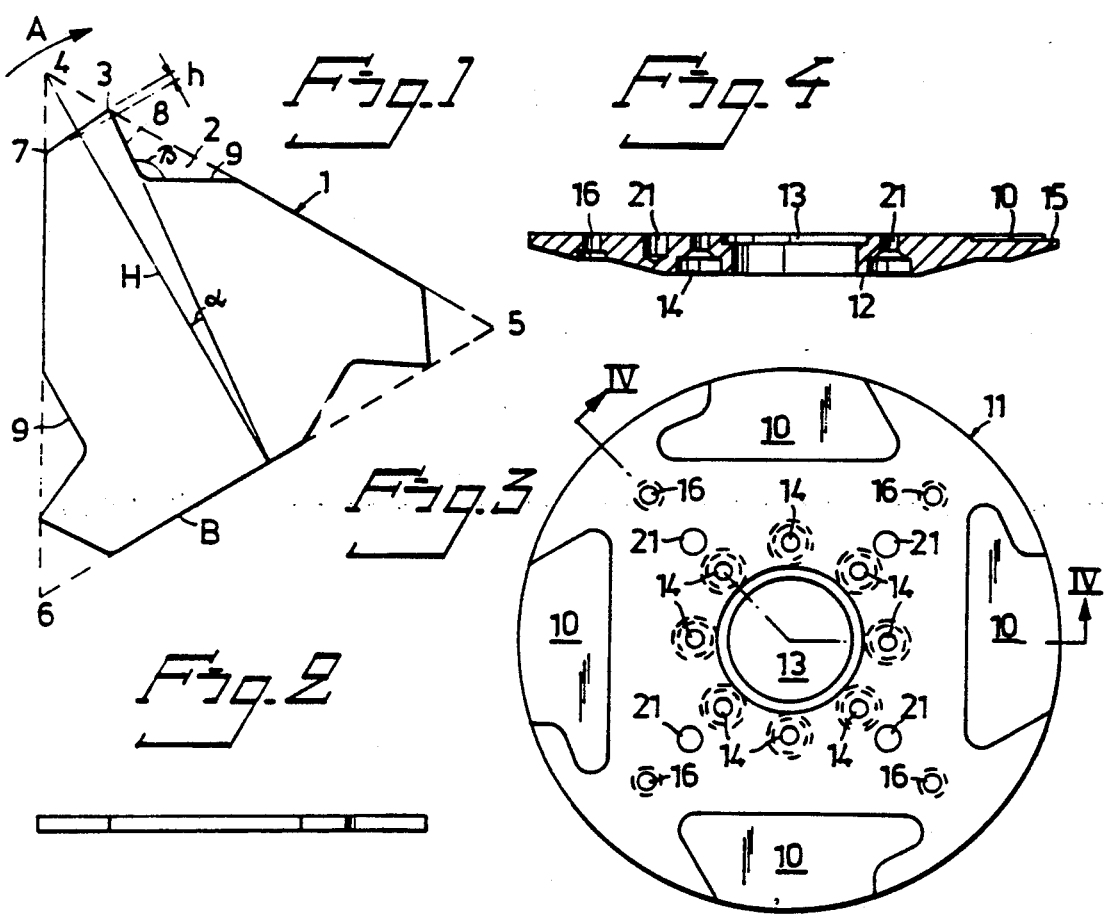

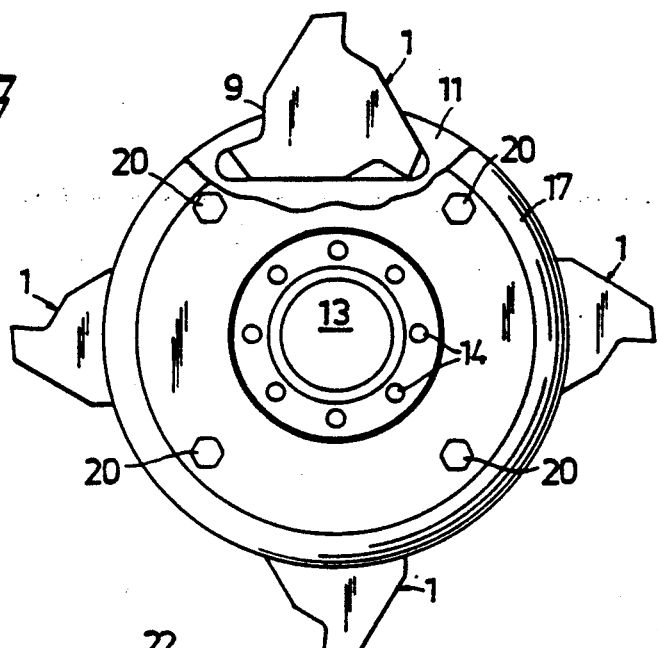
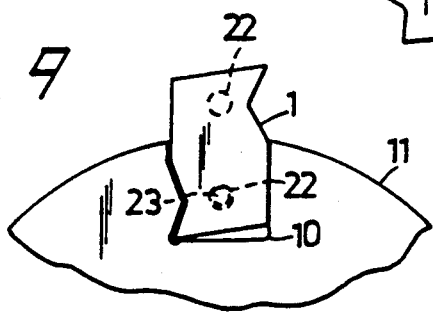
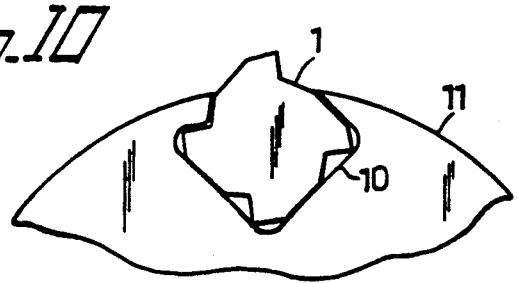

ROTATABLE BLADE FOR CLEARING UNITS

The invention relates to a rotatable blade for clearing units being arranged on a long, articulated parallel moving tool-carrying boom on a forestry vehicle or similar, said blade being provided with a plurality of dismountable and replacable teeth spaced around the periphery of the blade, each one of said teeth being symmetrically integrally shaped in the form of a disc with several cutting edges along its periphery.

These kind of blades are largely used when woods are cleared by means of clearing units mounted on a long, articulated, tool-carrying boom with a parallel motion mounted on a forestry vehicle or similar. The blades wear comparatively fast and, additionally are exposed to the risk of being destroyed entirely if the blade comes into contact with a stone or similar during the clearing. On the one hand this means comparatively large costs solely for the replacement of the blade, on the other hand this may also entail comparatively long periods of standstill for the machine. In connection with conventional blades the entire part of the clearing unit which holds the blade, and which is attached by means of at least eight bolts, normally must be dismounted. There also may be difficulties with the stock-keeping, and with the concomitant risks for a standstill if several blades are destroyed in an early phase. The blades are furthermore heavy and difficult to handle, especially when they are to be moved manually on location in the wood for replacement and mounting. Conventional blades may have a diameter of 70-80 cm and may weigh 75 kg or more. In this connection there are also great risks for injuries since the saw-teeth of the blade are very sharp. These risks for injuries may certainly be alleviated by means of different kinds of protective devices, but these may result in a further deterioration of the handling.

The object of the invention is to achieve a rotatable blade having a design which to a high degree alleviates the problems described above. This object is achieved in that the blade comprises a main part receiving the blade teeth in locking recesses and a pressure plate having substantially the same diameter as said main part and being arranged on top thereof an attached thereto, for instance by means of bolts, to lock the teeth in the recesses, and in that each locking recess corresponds to the periphery of each tooth and is open towards the pressure plate and the perifery of the main part so that only one of the cutting edges of the tooth projects from the blade, the remaining cutting edges being located in the recess, whereby the tooth can be removed from the recess, rotated in its own plane and replaced in the recess, so that another cutting edge projects from said blade.

In a preferred embodiment the basic form of the tooth essentially has the shape of an equilaretal triangle and is thus provided with three cutting edges.

BRIEF DESCRIPTION OF THE DRAWINGS

A preferred embodiment of the invention is described in the attached drawings wherein:

FIG. 1 illustrates a preferred embodiment of a tooth having a triangular basic shape, FIG. 2 illustrates the tooth in FIG. 1 as seen from the side, FIG. 3 illustrates the blade with the hub part in a horizontal plan, FIG. 4 illustrates a section along the line IV—IV in FIG. 3, FIG. 5 illustrates the pressure plate mounted on the upper side of the blade in order to hold the teeth in their recesses, FIG. 6 illustrates the pressure plate sectioned along the line VI—VI in FIG. 5, FIG. 7 illustrates the blade in a mounted condition as seen from the side, FIG. 8 is a horizontal plan of the blade in a mounted condition with part of the pressure plate broken away in order to illustrate the arrangement of a tooth in the recess corresponding to the tooth, FIG. 9 illustrates an alternative embodiment of a tooth with its associated recess and, FIG. 10 illustrates another alternative embodiment of a tooth with its associated recess.

Best Mode for Carrying Out the Invention

The tooth 1 shown in FIG. 1 essentially has a triangular shape, as can be seen by means of the dashed lines in the figure. As the figure is oriented, the tip 4 of the triangle being located uppermost in the figure is assumed to be the cutting edge currently in use. The height H has been drawn towards the base B, which, as can be seen in FIG. 7, in this case will be located inside a recess 10 in the blade. The rotational direction of the tooth is indicated by means of the arrow A. The tips 4, 5, 6 of the triangle are cut in such a way that the forwardly located edge 3, as seen in the direction of rotation, of the tip 4 will be located a slight distance h further away from the base B than the backwardly located edge 7 of the cut-away tip. The forward corner 3 at the cut-away part of the tip 4 of the triangle obtained in this way will define a cutting edge. A cut-out part 2 is formed adjacent this cutting edge which is delimited by a line which is drawn backwards and inwards towards the center of the tooth whilst forming an acute angle with the height H. At some distance from the corner 3 the cut-out part 2 is also delimited by a second line 9 forming an obtuse angle with the first line and ending in the side of the triangle. The other tips 5 and 6 are shaped in a corresponding way. The tooth is shown from the side in FIG. 2 and it can be seen here that the tooth advantageously can be designed with an even thickness such that the the blade easily can be shaped from standard plates of blade-steel with a suitable thickness for instance 7 mm if the side-length of the triangle is about 250 mm. The quality of steel used suitably has a hardness of 45-50 HRC.

FIGS. 3 and 4 illustrate how the main part 11 of the blade is shaped. This part has the shape of a disc with a thicker center part 12, a hub part, which is concentrically arranged relative to the center of the disc, being arranged in the center part 12 and being provided with bores 14, in this case eight, for the attachment of the blade to the clearing unit. A plurality, in this case four, recesses 10 are arranged evenly spaced around the periphery of the disc 11. Each recess 10 is provided with a planar side surface 15 on which the tooth 1 rests upon the the insertion of the tooth in the recess. The disc is also provided with a number of attachment holes 16 for bolts which are close to the periphery between the recesses 10. The disc is furthermore provided with a number of blind holes 21 for housing relatively strong springs, not shown, which have a length which is greater than the depth of the blind holes. The blind holes are arranged between the attachment holes 14 and the holes 16 for the pressure plate and number in this case four.

FIG. 5 shows a horizontal plan of a pressure plate 17 intended to be placed on top of the disc 11 in order to lock the teeth 1 definitely when they have been inserted into into their respective recesses 10. The pressure plate has four holes 18 for bolts which correspond to the attachment holes 16 in the main part 11 of the blade. The pressure plate is furthermore provided with a central opening 19 corresponding to the outer diameter of the hub part which allows the pressure plate to move freely relative to that part of the cleaning unit which cooperates with the hub part.

FIG. 7 shows the blade in an assembled condition with the main part 11 arranged as the under side and with the teeth 1 inserted into their recesses 10 and locked from above by the pressure plate 17, which is attached to the disc 11 by means of the bolts 20. FIG. 8 shows the blade in an assembled condition as seen from above, part of the pressure plate 17 having been broken away in order to illustrate how the tooth 1 fits into the recess 10. As can be seen in the figure, the recess 10 does not need to have the same shape as that part of the tooth 1 which is to be located in the recess 10, and the corners may be designed with a rounded shape in order to, in view of a simplified manufacture, permit the use of a end-cutter. As can be seen in FIG. 8, the cut-away part, which has been formed on the tooth adjacent the corners, is designed such that the cut-away part which is arranged in the backward side, as seen relative to the direction of movement of the tooth, will have a side edge 9 which essentially will be parallel with the height H of the triangle when the triangle is mounted with the base B in the recess 10. This is important for the transfer of forces from the tooth to the blade when the tooth strikes the trees etc to be cut. The forces which will act upon the projecting cutting edge mainly will be transferred to the backward edge, as seen in the rotational direction of the tooth, and to the base of the tooth and then to the the blade proper. With this design of the cut-out parts of the tooth a comparatively large surface will be obtained being oriented essentially perpendicularly to the direction of the forces which are to be transferred from the tooth to the blade, which means that the tooth rests in a stable manner in the recess 10 without risking to be wedged into the tapering parts of the recess 10. By these means the cutting edge in the recess oriented backwards is protected from damage caused by striking or cutting into the wall of the recess.

The main part 11 of the blade is always mounted on the cleaning unit and does normally not have to be dismounted. If a tooth is damaged it is sufficient to loosen the four bolts 18 somewhat whereafter the pressure plate will be lifted such a distance by the coil springs in the blind holes 21 that the tooth can be lifted out of the recess until it is free, whereafter the tooth can be pulled out. The tooth is then rotated 120 and is reinserted between the pressure plate 17 and the main part 11 until it again drops down into the recess, whereafter the bolts 18 are tightened. In this way a new, undamaged cutting edge has been obtained outermost on the blade. The entire tooth can easily be replaced with a new one in an analogous way and this in a especially simple way as compared with the exchange of a large, heavy blade made in one piece, since each tooth does not weigh more than 1.5 kg, as compared with 50 to 75 kgs for an entire blade. It furthermore is easy to carry a sufficient number of teeth on the machine in view of the size and the weight (one conventional blade corresponds to about 50 loose teeth). Each tooth is furthermore comparatively simple and cheap to manufacture. This means that the costs for spare parts is minimized if the blade is damaged, in conjunction with that the risks for longer periods of standstill is considerably diminished, both in view of a simplified store-keeping and in view of the simplified mounting of damaged parts. It should here be emphasized that if a conventional blade is damaged, the entire blade normally must be exchanged at a high cost, while only a cheap tooth normally must be replaced in the blade according to the invention.

The invention of course can be modified in many ways within the scope of the appended claims. In the embodiment described above the number of teeth has been exemplified with four, but can of course be chosen freely in dependence on the diameter of the blade etc. The teeth also can be somewhat displaced in parallel relative to each other in order to obtain a setting, for instance can each diametrically opposing pair of teeth be somewhat displaced relative to the adjacent pair of teeth or each tooth can be somewhat displaced relative to an adjacent tooth. The teeth have been illustrated as having a triangular basic shape but may also have a rectangular basic shape as shown in FIG. 9, the end surfaces of the rectangle being somewhat obliquely cut in analogy with the tooth described in connection with FIG. 1. The tooth may also advantageously be provided with a cut-out part corresponding to the cut-out parts which have described in connection with FIG. 1 in order to obtain a suitable angle of attack for the cutting edge. If the tooth is comparatively small and light it may be sufficient to design the recess located in the blade with a part which entirely corresponds to the cut-out part in the blade in such a way that the tooth is locked thereby. It is also possible to provide the tooth with two holes 22, indicated by dashed lines in the figure, intended to cooperate with a dowel 23, also indicated with dashed lines, which is arranged in the recess 10 arranged in the blade 11. The teeth may also have a square basic shape but otherwise be be shaped with obliquely cut corners with adjacent cut-out parts in a way analogous to FIG. 1, the diagonal of the square basic shape being arranged essentially radially relative to the blade 11. The alternative embodiments shown in FIGS. 9 and 10 are suitable in blades having larger diameters because of their comparatively large extent in the radial direction when mounted in the blade. It is also possible to combine different teeth by pairs in one and the same blade, in dependance of the desired result.

I claim:

1. A rotatable blade for a clearing unit comprising a main disc part having first and second sides and an annular peripheral edge, of a first diameter; a plurality of recesses formed in said main disc part, each recess opening towards one of said first and second sides and towards said peripheral edge; each recess receiving a removable and replaceable tooth, each tooth having a symmetrical shape including a peripheral surface provided with a plurality of spaced cutting edges; and a pressure plate having a second diameter substantially the same as said first diameter, said pressure plate secured to said one of said first and second sides of said main disc part to thereby lock each tooth in its respective recess; and wherein each said recess is shaped and configured such that only one of said spaced cutting edges of each tooth projects radially from a respective recess, and whereby each tooth can be removed from its respective recess beyond said annular peripheral edge, rotated in its own plane and replaced in said respective recess so that another of said plurality of cutting edges projects radially from said recess.

2. A blade according to claim 1 wherein one pair of diagonally opposing teeth are located in a plane displaced in parallel relative to another plane for the remaining teeth.

3. A blade according to claim 1 wherein each tooth is located in a plane which is displaced in parallel relative to a plane for an adjacent tooth.

4. A blade according to claim 1 wherein each tooth is shaped substantially as an equilateral triangle and is provided with three cutting edges.

5. A blade according to claim 4 wherein tips of the equilateral triangle shape of each tooth are cut obliquely such that the tooth is provided with three outer sides whose forwardly located edges, as seen in the direction of rotation, form said three cutting edges, and are located radially further beyond an opposed base of the triangle located in said recess of the blade than rearwardly located edges of said three outer sides, and wherein the sides of the triangle which are located adjacent the forward edges of the outer sides, as seen in the direction of rotation, have a cut-out portion having an obtuse angle in order to provide a desired angle of attack of the cutting edges.

6. A blade according to claim 1 wherein at least one tooth has a substantially square shape, a diagonal of the square oriented in a radial direction relative to the blade.

* * * * *